United States Patent
Garay et al.

(10) Patent No.: US 10,807,154 B2
(45) Date of Patent: Oct. 20, 2020

(54) INTEGRATED CASTING CORE-SHELL STRUCTURE FOR MAKING CAST COMPONENT WITH COOLING HOLES IN INACCESSIBLE LOCATIONS

(71) Applicant: GENERAL ELECTRIC COMPANY, Schenectady, NY (US)

(72) Inventors: Gregory Terrence Garay, West Chester, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 744 days.

(21) Appl. No.: 15/377,783

(22) Filed: Dec. 13, 2016

(65) Prior Publication Data

US 2018/0161858 A1 Jun. 14, 2018

(51) Int. Cl.
*B22C 9/22* (2006.01)
*B28B 7/34* (2006.01)
(Continued)

(52) U.S. Cl.
CPC ............ *B22C 9/22* (2013.01); *B22C 7/02* (2013.01); *B22C 9/04* (2013.01); *B22D 29/002* (2013.01); *B28B 1/001* (2013.01); *B28B 7/346* (2013.01); *B29C 64/135* (2017.08); *B33Y 10/00* (2014.12); *B33Y 80/00* (2014.12); *F01D 5/187* (2013.01);
(Continued)

(58) Field of Classification Search
CPC .... B22C 9/22; B22C 7/02; B22C 9/04; B29C 64/135; B29L 2031/757; B28B 7/346; B28B 1/001; B22D 29/002; B33Y 80/00; F01D 5/187; F01D 9/065;
(Continued)

(56) References Cited

U.S. PATENT DOCUMENTS 3,628,885 A * 12/1971 Sidenstick ............ F01D 5/189
416/217
5,256,340 A 10/1993 Allison et al.
(Continued)

FOREIGN PATENT DOCUMENTS

EP 2743451 A1 6/2014
EP 2853323 A2 4/2015
(Continued)

OTHER PUBLICATIONS

International Search Report and Written Opinion issued in connection with corresponding PCT Application No. PCT/US2017/060158 dated Feb. 9, 2018.
(Continued)

*Primary Examiner* — Phutthiwat Wongwian
*Assistant Examiner* — Arnold Castro
(74) *Attorney, Agent, or Firm* — Dority & Manning, P.A.

(57) ABSTRACT

The present disclosure generally relates to integrated core-shell investment casting molds that provide filament structures corresponding to cooling hole patterns in the surface of the turbine blade or stator vane, including in locations that are inaccessible due to the presence of protrusion patterns. The filament structures also provide a leaching pathway for the core portion after metal casting. The invention also relates to core filaments that can be used to supplement the leaching pathway, for example in a core tip portion of the mold.

13 Claims, 9 Drawing Sheets

(51) Int. Cl.
- *B22D 29/00* (2006.01)
- *B22C 9/04* (2006.01)
- *B22C 7/02* (2006.01)
- *B28B 1/00* (2006.01)
- *B33Y 10/00* (2015.01)
- *B33Y 80/00* (2015.01)
- *B29C 64/135* (2017.01)
- *F01D 5/18* (2006.01)
- *F01D 9/06* (2006.01)
- *B29L 31/00* (2006.01)

(52) U.S. Cl.
CPC ......... *B29L 2031/757* (2013.01); *F01D 9/065* (2013.01); *F05D 2230/211* (2013.01); *F05D 2260/204* (2013.01); *F05D 2300/607* (2013.01); *Y02P 10/25* (2015.11); *Y02T 50/60* (2013.01)

(58) Field of Classification Search
CPC ......... F05D 2300/607; F05D 2260/204; F05D 2230/211; Y02P 10/292; Y02T 50/676
See application file for complete search history.

(56) References Cited

U.S. PATENT DOCUMENTS

| | | | |
|---|---|---|---|
| 5,296,308 A | 3/1994 | Caccavale et al. | |
| 5,387,380 A | 2/1995 | Cima et al. | |
| 5,545,003 A * | 8/1996 | O'Connor | B22C 9/04 415/115 |
| 6,595,749 B2 * | 7/2003 | Lee | B23P 6/005 415/173.1 |
| 7,527,475 B1 | 5/2009 | Liang | |
| 8,506,836 B2 | 8/2013 | Szuromi et al. | |
| 8,641,807 B2 | 2/2014 | Thomas | |
| 8,851,151 B2 | 10/2014 | Frasier et al. | |
| 8,985,540 B1 | 3/2015 | Slesinski | |
| 9,039,382 B2 | 5/2015 | Stapleton | |
| 9,079,357 B2 | 7/2015 | Ebert et al. | |
| 2001/0024000 A1 | 9/2001 | Lee et al. | |
| 2005/0205232 A1 | 9/2005 | Wang et al. | |
| 2008/0135722 A1 | 6/2008 | Wang et al. | |
| 2010/0003619 A1 | 1/2010 | Das et al. | |
| 2010/0068465 A1 | 3/2010 | Su et al. | |
| 2011/0310370 A1 | 12/2011 | Rohner et al. | |
| 2013/0224423 A1 | 8/2013 | Mikulak et al. | |
| 2014/0079540 A1 | 3/2014 | Morris et al. | |
| 2014/0271129 A1 | 9/2014 | Mueller et al. | |
| 2014/0352562 A1 * | 12/2014 | Raymond, Jr. | B41F 17/001 101/324 |
| 2015/0064015 A1 | 3/2015 | Perez | |
| 2015/0090074 A1 | 4/2015 | Etter et al. | |
| 2015/0209910 A1 | 7/2015 | Denney et al. | |
| 2015/0321249 A1 | 11/2015 | Shah et al. | |
| 2016/0038866 A1 | 2/2016 | Gibson et al. | |
| 2016/0221262 A1 | 8/2016 | Das et al. | |
| 2018/0161852 A1 * | 6/2018 | McCarren | B22C 9/22 |
| 2018/0161853 A1 * | 6/2018 | Deines | B22C 9/22 |
| 2018/0161854 A1 * | 6/2018 | Deines | B29C 64/135 |
| 2018/0161855 A1 * | 6/2018 | Deines | B22C 9/22 |
| 2018/0161856 A1 * | 6/2018 | Yang | B28B 7/342 |
| 2018/0161857 A1 * | 6/2018 | Garay | B22C 9/22 |
| 2018/0161859 A1 * | 6/2018 | Garay | B22C 9/22 |
| 2018/0161866 A1 * | 6/2018 | Deines | B22C 9/10 |

FOREIGN PATENT DOCUMENTS

| | | |
|---|---|---|
| WO | 2009/085654 A1 | 7/2009 |
| WO | WO-2010/045950 A1 | 4/2010 |

OTHER PUBLICATIONS

Deines, J.H., et al., Integrated casting core-shell structure, GE co-pending U.S. Appl. No. 15/377,728, filed Dec. 13, 2016.

Deines, J.H., et al, Integrated casting core-shell structure with floating tip plenum, GE co-pending U.S. Appl. No. 15/377,711, filed Dec. 13, 2016.

Deines, J.H., et al., Multi-piece integrated core-shell structure with standoff and/or bumper for making cast component, GE co-pending U.S. Appl. No. 15/377,746, filed Dec. 13, 2016.

Garay, G.T., et al., "Integrated casting core-shell structure for making cast component with non-linear holes," GE co-pending U.S. Appl. No. 15/377,787, filed Dec. 13, 2016.

Garay, G.T., et al., Integrated casting core-shell structure for making cast components having thin root components, GE co-pending U.S. Appl. No. 15/377,766, filed Dec. 13, 2016.

McCarren, M.J., et al., Integrated casting core-shell structure with printed tubes for making cast component, GE co-pending U.S. Appl. No. 15/377,673, filed Dec. 13, 2016.

Peterson, B.R, et al., Multi-piece integrated core-shell structure for making cast component, GE co-pending U.S. Appl. No. 15/377,796, filed Dec. 13, 2016.

Yang, X., et al., Integrated casting core-shell structure and filter for making cast component, GE co-pending U.S. Appl. No. 15/377,759, filed Dec. 13, 2016.

European Search Report Corresponding to Application No. 17881001 dated Jun. 15, 2020.

* cited by examiner

INTEGRATED CASTING CORE-SHELL STRUCTURE FOR MAKING CAST COMPONENT WITH COOLING HOLES IN INACCESSIBLE LOCATIONS

The present disclosure generally relates to investment casting core-shell mold components and processes utilizing these components. The core-shell mold made in accordance with the present invention includes integrated ceramic filaments between the core and shell of the mold that can be utilized to form holes, i.e., effusion cooling holes, in the cast component made from these molds, including in locations that are inaccessible due to the presence of protrusion patterns. The use of sufficient ceramic filaments between core and shell to both locate and provide leaching pathways for the core serpentine also enables the elimination of ball braze chutes. Ceramic filaments between the tip plenum core and the shell may also be provided to support a floating tip plenum, eliminating the need for traditional tip pins, and their subsequent closure by brazing. The integrated core-shell molds provide useful properties in casting operations, such as in the casting of superalloys used to make turbine blades and stator vanes for jet aircraft engines or power generation turbine components.

BACKGROUND

Many modern engines and next generation turbine engines require components and parts having intricate and complex geometries, which require new types of materials and manufacturing techniques. Conventional techniques for manufacturing engine parts and components involve the laborious process of investment or lost-wax casting. One example of investment casting involves the manufacture of a typical rotor blade used in a gas turbine engine. A turbine blade typically includes hollow airfoils that have radial channels extending along the span of a blade having at least one or more inlets for receiving pressurized cooling air during operation in the engine. The various cooling passages in a blade typically include a serpentine channel disposed in the middle of the airfoil between the leading and trailing edges. The airfoil typically includes inlets extending through the blade for receiving pressurized cooling air, which include local features such as short turbulator ribs or pins for increasing the heat transfer between the heated sidewalls of the airfoil and the internal cooling air.

Figure 1:
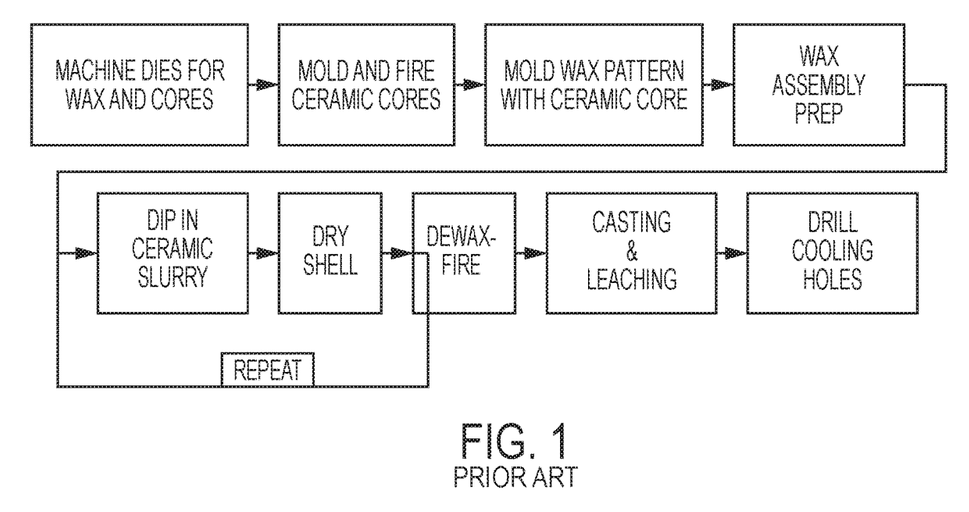
FIG. 1 is a flow diagram showing the steps for conventional investment casting.
Figure 2:
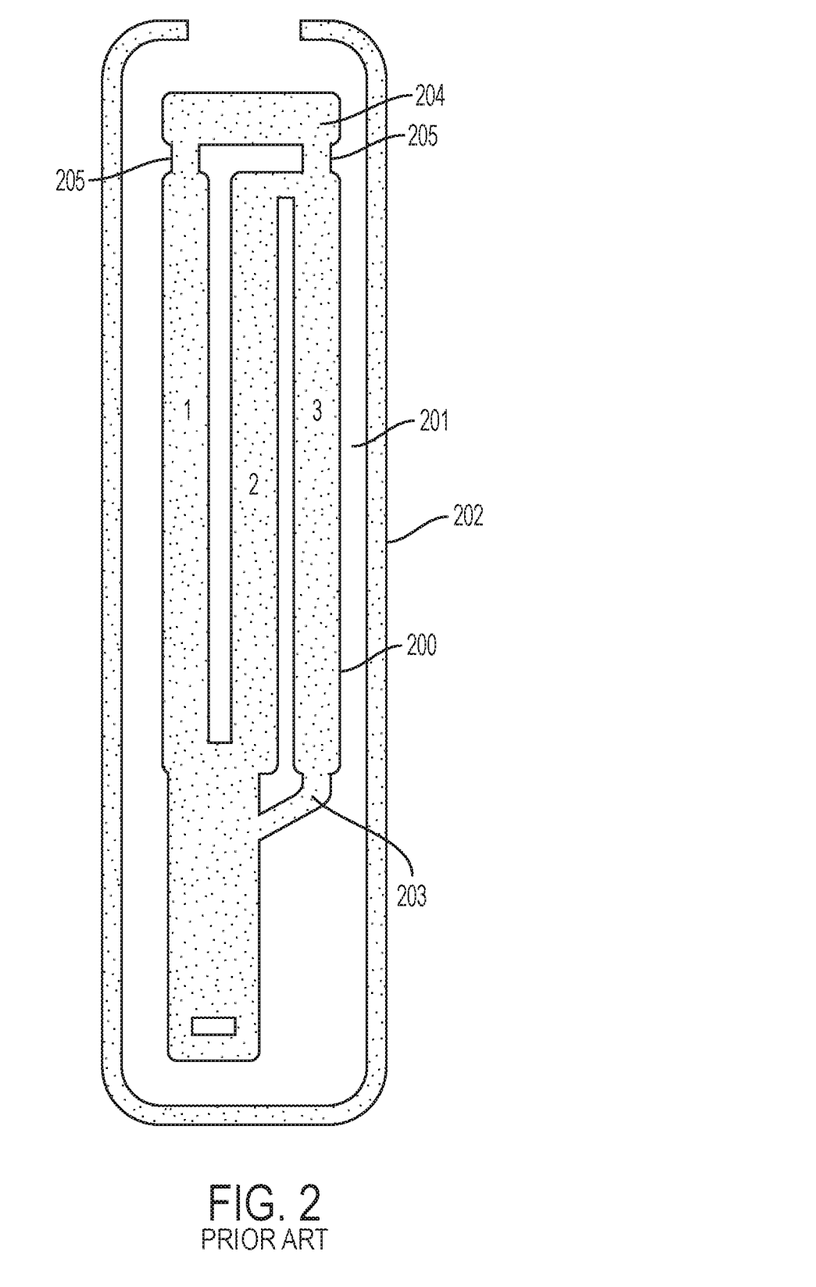
FIG. 2 is a schematic diagram showing an example of a conventional scheme for a core-shell mold with ball chute prepared by a conventional process.

The manufacture of these turbine blades, typically from high strength, superalloy metal materials, involves numerous steps shown in FIG. 1. First, a precision ceramic core is manufactured to conform to the intricate cooling passages desired inside the turbine blade. A precision die or mold is also created which defines the precise 3-D external surface of the turbine blade including its airfoil, platform, and integral dovetail. A schematic view of such a mold structure is shown in FIG. 2. The ceramic core 200 is assembled inside two die halves which form a space or void therebetween that defines the resulting metal portions of the blade. Wax is injected into the assembled dies to fill the void and surround the ceramic core encapsulated therein. The two die halves are split apart and removed from the molded wax. The molded wax has the precise configuration of the desired blade and is then coated with a ceramic material to form a surrounding ceramic shell 202. Then, the wax is melted and removed from the shell 202 leaving a corresponding void or space 201 between the ceramic shell 202 and the internal ceramic core 200 and tip plenum 204. Molten superalloy metal is then poured into the shell to fill the void therein and again encapsulate the ceramic core 200 and tip plenum 204 contained in the shell 202. The molten metal is cooled and solidifies, and then the external shell 202 and internal core 200 and tip plenum 204 are suitably removed leaving behind the desired metallic turbine blade in which the internal cooling passages are found. In order to provide a pathway for removing ceramic core material via a leaching process, a ball chute 203 and tip pins 205 are provided, which upon leaching form a ball chute and tip holes within the turbine blade that must subsequently brazed shut.

The cast turbine blade may then undergo additional post-casting modifications, such as but not limited to drilling of suitable rows of film cooling holes through the sidewalls of the airfoil as desired for providing outlets for the internally channeled cooling air which then forms a protective cooling air film or blanket over the external surface of the airfoil during operation in the gas turbine engine. After the turbine blade is removed from the ceramic mold, the ball chute 203 of the ceramic core 200 forms a passageway that is later brazed shut to provide the desired pathway of air through the internal voids of the cast turbine blade. However, these post-casting modifications are limited and given the ever increasing complexity of turbine engines and the recognized efficiencies of certain cooling circuits inside turbine blades, more complicated and intricate internal geometries are required. While investment casting is capable of manufacturing these parts, positional precision and intricate internal geometries become more complex to manufacture using these conventional manufacturing processes. Accordingly, it is desired to provide an improved casting method for three dimensional components having intricate internal voids.

Figure 3:
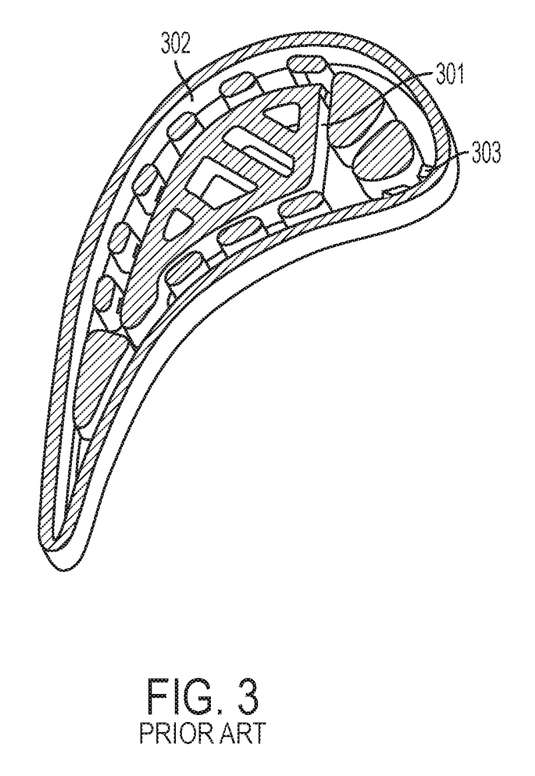
FIG. 3 shows a perspective view of a prior art integrated core-shell mold with ties connecting the core and shell portions.

Methods for using 3-D printing to produce a ceramic core-shell mold are described in U.S. Pat. No. 8,851,151 assigned to Rolls-Royce Corporation. The methods for making the molds include powder bed ceramic processes such as disclosed U.S. Pat. No. 5,387,380 assigned to Massachusetts Institute of Technology, and selective laser activation (SLA) such as disclosed in U.S. Pat. No. 5,256,340 assigned to 3D Systems, Inc. The ceramic core-shell molds according to the '151 patent are limited by the printing resolution capabilities of these processes. As shown in FIG. 3, the core portion 301 and shell portion 302 of the integrated core-shell mold is held together via a series of tie structures 303 provided at the bottom edge of the mold. Cooling passages are proposed in the '151 patent that include staggered vertical cavities joined by short cylinders, the length of which is nearly the same as its diameter. A superalloy turbine blade is then formed in the core-shell mold using known techniques disclosed in the '151 patent, and incorporated herein by reference. After a turbine blade is cast in one of these core-shell molds, the mold is removed to reveal a cast superalloy turbine blade.

There remains a need to prepare ceramic core-shell molds produced using higher resolution methods that are capable of providing fine detail cast features in the end-product of the casting process.

SUMMARY

In one embodiment, the invention relates to a method of making a ceramic mold having a core and shell. The method having steps of (a) contacting a cured portion of a workpiece with a liquid ceramic photopolymer; (b) irradiating a portion of the liquid ceramic photopolymer adjacent to the cured portion through a window contacting the liquid ceramic photopolymer; (c) removing the workpiece from the uncured liquid ceramic photopolymer; and (d) repeating steps (a)-(c) until a ceramic mold is formed, the ceramic mold comprising a core portion and a shell portion with at least one cavity between the core portion and the shell portion, the cavity adapted to define the shape of a cast component upon casting and removal of the ceramic mold. The ceramic mold further comprises a plurality of filaments joining the core portion and the shell portion where each filament spans between the core and shell and defines a hole in the cast component upon removal of the mold. The filament intersects the core at a first point and the filament intersects the shell at a second point, and an imaginary line joining the first point and the second point also intersects an outer portion of the cavity that extends further away from the center of the mold than the second point. After step (d), the process may further include a step (e) of pouring a liquid metal into a casting mold and solidifying the liquid metal to form the cast component. After step (e), the process may further include a step (f) comprising removing the mold from the cast component, and this step preferably involves a combination of mechanical force and chemical leaching in an alkaline bath.

In another aspect, the invention relates to a method of preparing a cast component. The method includes steps of pouring a liquid metal into a ceramic casting mold and solidifying the liquid metal to form the cast component, the ceramic casting mold comprising a core portion and a shell portion with at least one cavity between the core portion and the shell portion, the cavity adapted to define the shape of the cast component upon casting and removal of the ceramic mold, and the ceramic casting mold further comprising a plurality of filaments joining the core portion and the shell portion where each filament spans between the core and shell, the filaments adapted to define a plurality of holes in the cast component upon removal of the mold, where the filament intersects the core at a first point and the filament intersects the shell at a second point, and an imaginary line joining the first point and the second point also intersects an outer portion of the cavity that extends further away from the center of the mold than the second point; and removing the ceramic casting mold from the cast component by leaching at least a portion of the ceramic core through the holes in the cast component provided by the filaments.

In another aspect, the invention relates to a ceramic casting mold having a core portion and a shell portion with at least one cavity between the core portion and the shell portion, the cavity adapted to define the shape of the cast component upon casting and removal of the ceramic mold; a plurality of filaments joining the core portion and the shell portion where each filament spans between the core and shell, the filaments adapted to define a plurality of holes providing fluid communication between a cavity within the cast component defined by the core portion and an outer surface of the cast component upon removal of the mold. The filament intersects the core at a first point and the filament intersects the shell at a second point, and an imaginary line joining the first point and the second point also intersects an outer portion of the cavity that extends further away from the center of the mold than the second point. In yet another aspect, the invention relates to a single crystal metal turbine blade or stator vane having an inner cavity and an outer surface, a plurality of cooling holes providing fluid communication between the inner cavity and the outer surface wherein at least cooling is located such that an imaginary line joining a first point at the intersection of the cooling hole with the inner cavity and a second point at the intersection of the cooling hole with the outer surface intersects an outer portion of the turbine blade or stator vane extending further away from the center of the turbine blade than the second point. Preferably, the single crystal metal is a superalloy.

In one aspect, the outer portion forms at least part of a root component or a trailing edge in a turbine blade or stator vane, or at least part of an overhang in a turbine blade or stator vane.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for making cast metal parts, and preferably those cast metal parts used in the manufacture of jet aircraft engines. Specifically, the production of single crystal, nickel-based superalloy cast parts such as turbine blades, vanes, and shroud components can be advantageously produced in accordance with this invention. However, other cast metal components may be prepared using the techniques and integrated ceramic molds of the present invention.

The present inventors recognized that prior processes known for making integrated core-shell molds lacked the fine resolution capability necessary to print filaments extending between the core and shell portion of the mold of sufficiently small size and quantity to result in effusion cooling holes in the finished turbine blade. In the case of earlier powder bed processes, such as disclosed in U.S. Pat. No. 5,387,380 assigned to Massachusetts Institute of Technology, the action of the powder bed recoater arm precludes formation of sufficiently fine filaments extending between the core and shell to provide an effusion cooling hole pattern in the cast part. Other known techniques such as selective laser activation (SLA) such as disclosed in U.S. Pat. No. 5,256,340 assigned to 3D Systems, Inc. that employ a top-down irradiation technique may be utilized in producing an integrated core-shell mold in accordance with the present invention. However, the available printing resolution of these systems significantly limit the ability to make filaments of sufficiently small size to serve as effective cooling holes in the cast final product. In particular, these prior processes and systems known for making integrated core-shell molds are unable to make cooling holes in a cast final product having one or more outer portions or overhangs, specifically in locations that are proximal to these outer portions or overhangs.

The present inventors have found that the integrated core-shell mold of the present invention can be manufactured using direct light processing (DLP). DLP differs from the above discussed powder bed and SLA processes in that the light curing of the polymer occurs through a window at the bottom of a resin tank that projects light upon a build platform that is raised as the process is conducted. With DLP an entire layer of cured polymer is produced simultaneously, and the need to scan a pattern using a laser is eliminated. Further, the polymerization occurs between the underlying window and the last cured layer of the object being built. The underlying window provides support allowing thin filaments of material to be produced without the need for a separate support structure. In other words, producing a thin filament of material bridging two portions of the build object is difficult and was typically avoided in the prior art. For example, the '151 patent discussed above in the background section of this application used vertical plate structures connected with short cylinders, the length of which was on the order of their diameter. Staggered vertical cavities are necessitated by the fact that the powder bed and SLA techniques disclosed in the '151 patent require vertically supported ceramic structures and the techniques are incapable of reliably producing filaments. In addition, the available resolution within a powder bed is on the order of ⅛" (3.2 mm) making the production of traditional cooling holes impracticable. For example, round cooling holes generally have a diameter of less than 2 mm corresponding to a cooling hole area below 3.2 mm². Production of a hole of such dimensions requires a resolution far below the size of the actual hole given the need to produce the hole from several voxels. This resolution is simply not available in a powder bed process. Similarly, stereolithography is limited in its ability to produce such filaments due to lack of support and resolution problems associated with laser scattering. But the fact that DLP exposes the entire length of the filament and supports it between the window and the build plate enables producing sufficiently thin filaments spanning the entire length between the core and shell to form a ceramic object having the desired cooling hole pattern. Although powder bed and SLA may be used to produce filaments, their ability to produce sufficiently fine filaments as discussed above is limited.

One suitable DLP process is disclosed in U.S. Pat. No. 9,079,357 assigned to Ivoclar Vivadent AG and Technische Universitat Wien, as well as WO 2010/045950 A1 and US 2011310370, each of which are hereby incorporated by reference and discussed below with reference to FIGS. 4-7. The apparatus includes a tank 404 having at least one translucent bottom portion 406 covering at least a portion of the exposure unit 410. The exposure unit 410 comprises a light source and modulator with which the intensity can be adjusted position-selectively under the control of a control unit, in order to produce an exposure field on the tank bottom 406 with the geometry desired for the layer currently to be formed. As an alternative, a laser may be used in the exposure unit, the light beam of which successively scans the exposure field with the desired intensity pattern by means of a mobile mirror, which is controlled by a control unit.

Figure 4:
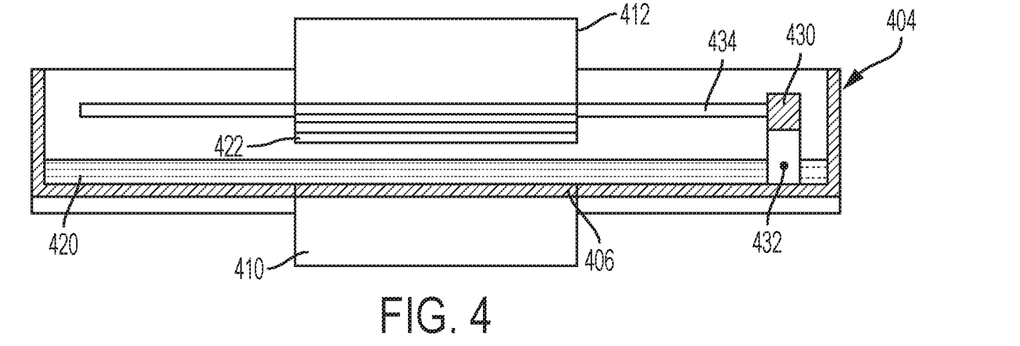
FIGS. 4, 5, 6 and 7 show schematic lateral sectional views of a device for carrying out successive phases of the method for direct light processing (DLP).

Opposite the exposure unit 410, a production platform 412 is provided above the tank 404; it is supported by a lifting mechanism (not shown) so that it is held in a height-adjustable way over the tank bottom 406 in the region above the exposure unit 410. The production platform 412 may likewise be transparent or translucent in order that light can be shone in by a further exposure unit above the production platform in such a way that, at least when forming the first layer on the lower side of the production platform 412, it can also be exposed from above so that the layer cured first on the production platform adheres thereto with even greater reliability.

The tank 404 contains a filling of highly viscous photopolymerizable material 420. The material level of the filling is much higher than the thickness of the layers which are intended to be defined for position-selective exposure. In order to define a layer of photopolymerizable material, the following procedure is adopted. The production platform 412 is lowered by the lifting mechanism in a controlled way so that (before the first exposure step) its lower side is immersed in the filling of photopolymerizable material 420 and approaches the tank bottom 406 to such an extent that precisely the desired layer thickness Δ (see FIG. 5) remains between the lower side of the production platform 412 and the tank bottom 406. During this immersion process, photopolymerizable material is displaced from the gap between the lower side of the production platform 412 and the tank bottom 406. After the layer thickness Δ has been set, the desired position-selective layer exposure is carried out for this layer, in order to cure it in the desired shape. Particularly when forming the first layer, exposure from above may also take place through the transparent or translucent production platform 412, so that reliable and complete curing takes place particularly in the contact region between the lower side of the production platform 412 and the photopolymerizable material, and therefore good adhesion of the first layer to the production platform 412 is ensured. After the layer has been formed, the production platform is raised again by means of the lifting mechanism.

Figure 5:
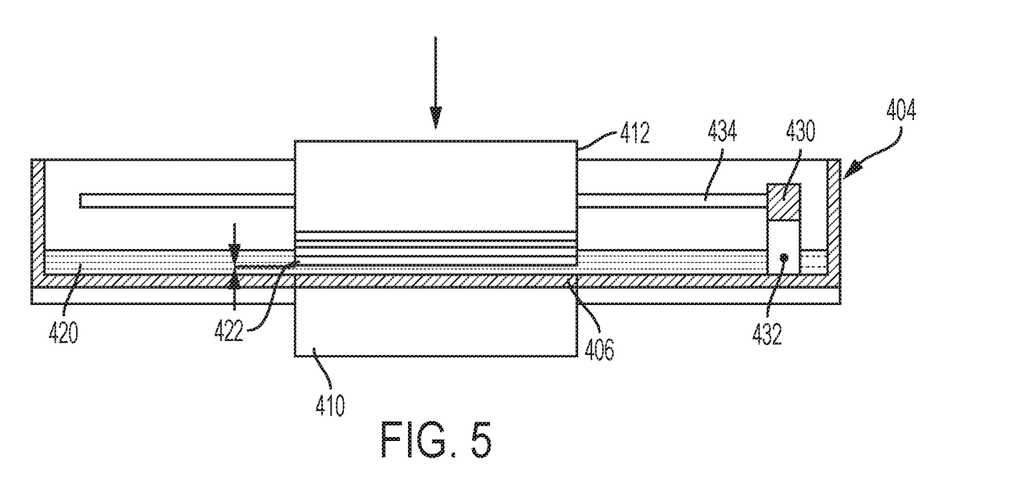

These steps are subsequently repeated several times, the distance from the lower side of the layer 422 formed last to the tank bottom 406 respectively being set to the desired layer thickness Δ and the next layer thereupon being cured position-selectively in the desired way.

Figure 6:
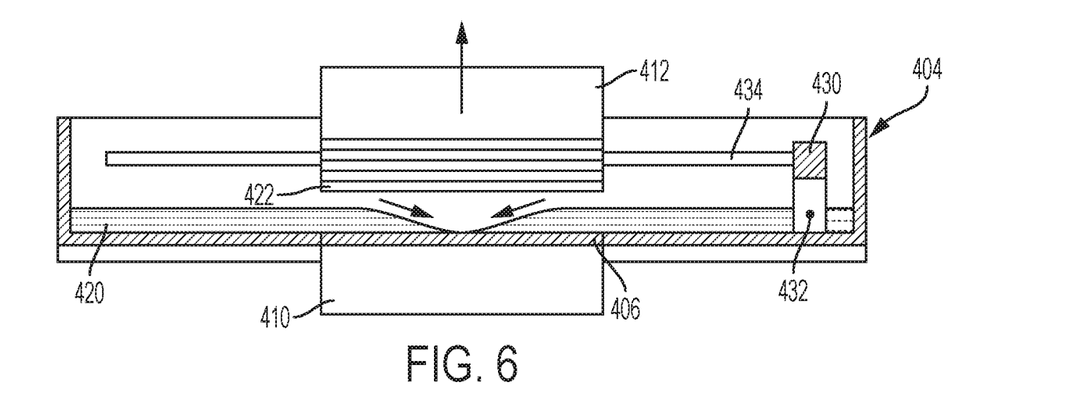

After the production platform 412 has been raised following an exposure step, there is a material deficit in the exposed region as indicated in FIG. 6. This is because after curing the layer set with the thickness Δ, the material of this layer is cured and raised with the production platform and the part of the shaped body already formed thereon. The photopolymerizable material therefore missing between the lower side of the already formed shaped body part and the tank bottom 406 must be filled from the filling of photopolymerizable material 420 from the region surrounding the exposed region. Owing to the high viscosity of the material, however, it does not flow by itself back into the exposed region between the lower side of the shaped body part and the tank bottom, so that material depressions or "holes" can remain here.

Figure 7:
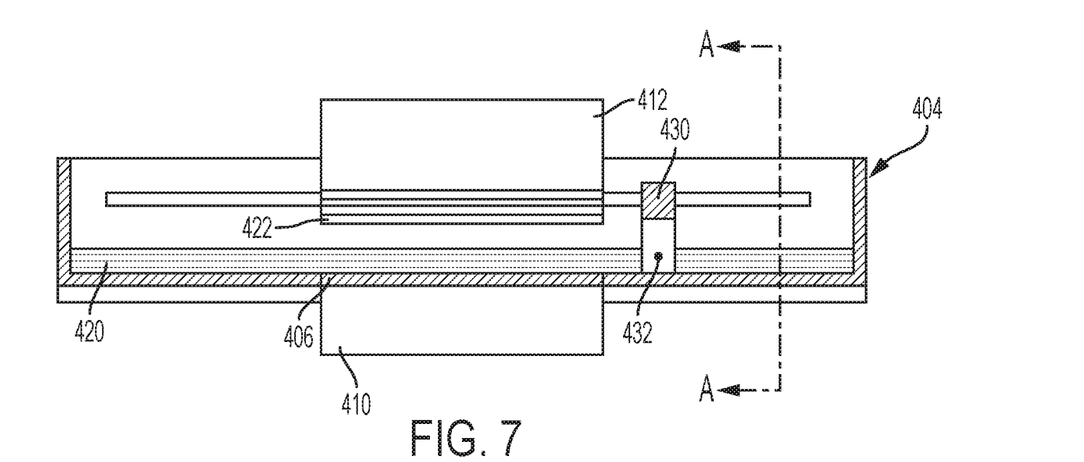

In order to replenish the exposure region with photopolymerizable material, an elongate mixing element 432 is moved through the filling of photopolymerizable material 420 in the tank. In the exemplary embodiment represented in FIGS. 4 to 8, the mixing element 432 comprises an elongate wire which is tensioned between two support arms 430 mounted movably on the side walls of the tank 404. The support arms 430 may be mounted movably in guide slots 434 in the side walls of the tank 404, so that the wire 432 tensioned between the support arms 430 can be moved relative to the tank 404, parallel to the tank bottom 406, by moving the support arms 430 in the guide slots 434. The elongate mixing element 432 has dimensions, and its movement is guided relative to the tank bottom, such that the upper edge of the elongate mixing element 432 remains below the material level of the filling of photopolymerizable material 420 in the tank outside the exposed region. As can be seen in the sectional view of FIG. 8, the mixing element 432 is below the material level in the tank over the entire length of the wire, and only the support arms 430 protrude beyond the material level in the tank. The effect of arranging the elongate mixing element below the material level in the tank 404 is not that the elongate mixing element 432 substantially moves material in front of it during its movement relative to the tank through the exposed region, but rather this material flows over the mixing element 432 while executing a slight upward movement. The movement of the mixing element 432 from the position shown in FIG. 6, to, for example, a new position 421 in the direction indicated by the arrow A, is shown in FIG. 7. It has been found that by this type of action on the photopolymerizable material in the tank, the material is effectively stimulated to flow back into the material-depleted exposed region between the production platform 412 and the exposure unit 410.

Figure 8:
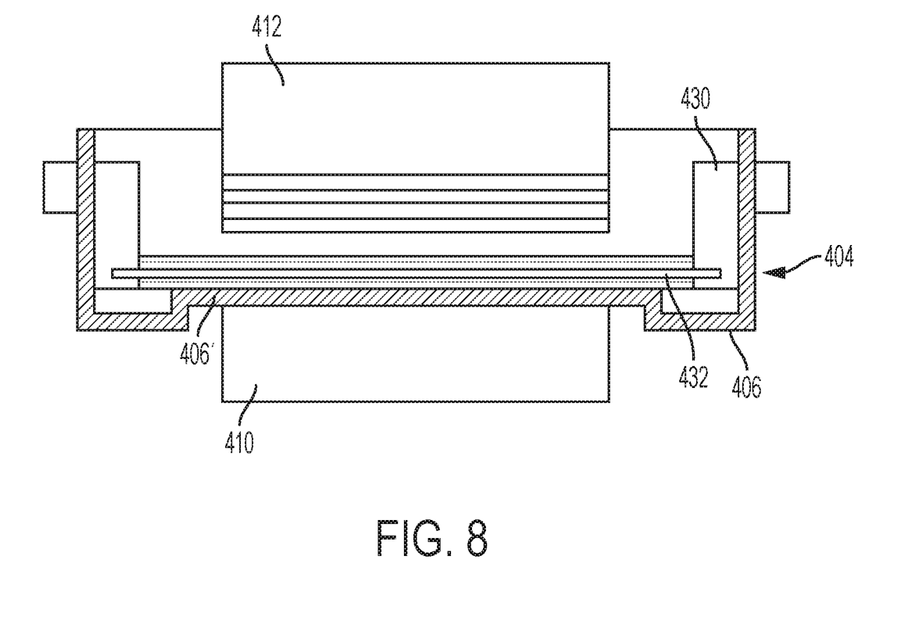
FIG. 8 shows a schematic sectional view along the line A-A of FIG. 7.

The movement of the elongate mixing element 432 relative to the tank may firstly, with a stationary tank 404, be carried out by a linear drive which moves the support arms 430 along the guide slots 434 in order to achieve the desired movement of the elongate mixing element 432 through the exposed region between the production platform 412 and the exposure unit 410. As shown in FIG. 8, the tank bottom 406 has recesses 406' on both sides. The support arms 430 project with their lower ends into these recesses 406'. This makes it possible for the elongate mixing element 432 to be held at the height of the tank bottom 406, without interfering with the movement of the lower ends of the support arms 430 through the tank bottom 406.

Other alternative methods of DLP may be used to prepare the integrated core-shell molds of the present invention. For example, the tank may be positioned on a rotatable platform. When the workpiece is withdrawn from the viscous polymer between successive build steps, the tank may be rotated relative to the platform and light source to provide a fresh layer of viscous polymer in which to dip the build platform for building the successive layers.

Figure 9:
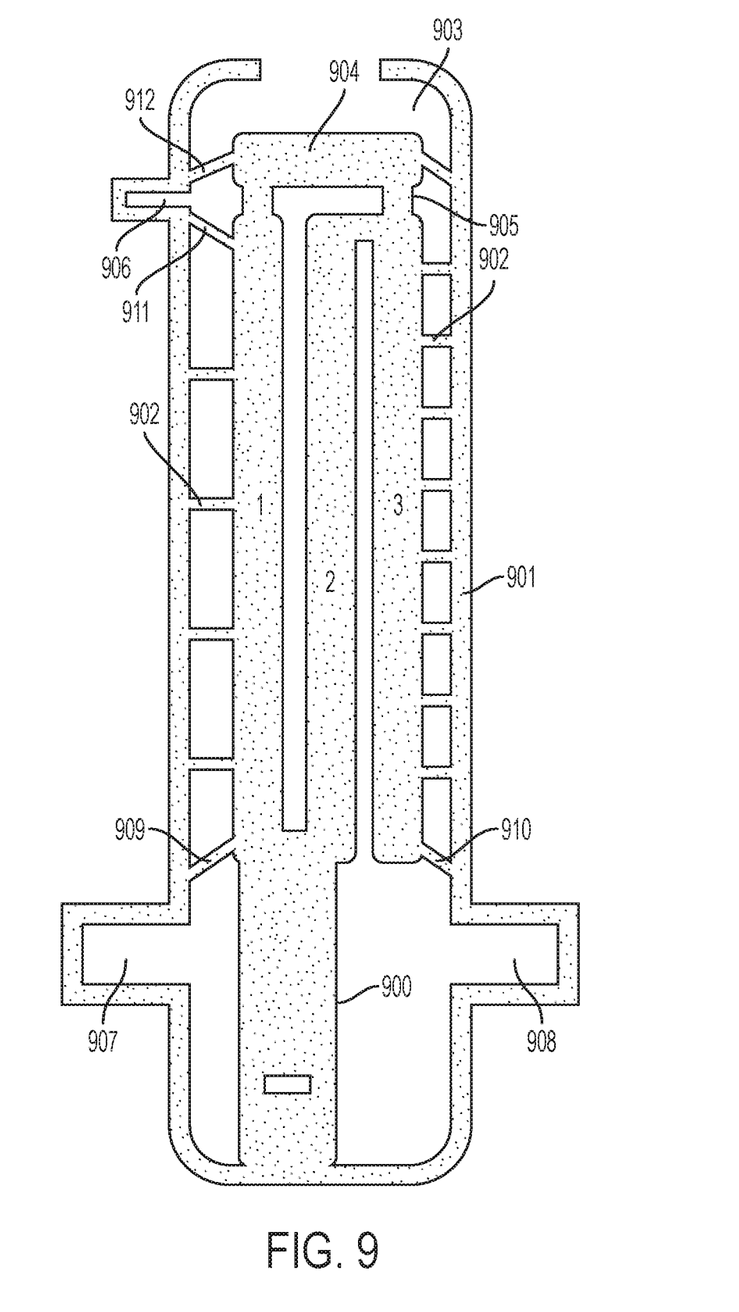
FIG. 9 shows a side view of an integrated core-shell mold with linear filaments connecting the core and shell portions.

FIG. 9 shows a schematic side of an integrated core-shell mold having horizontal filaments 902 and sloping or diagonal filaments (e.g. 909, 910, 911, 912) connecting the core 900 and the shell portions 901 according to one embodiment of the present invention. By printing the ceramic mold using the above DLP printing process, the mold can be made in a way that allows the point of connections between the core and the shell to be provided through the filaments. Once the core-shell mold is printed, it may be subject to a post-heat treatment step to cure the printed ceramic polymer material. The cured ceramic mold may then be used similar to the traditional casting process used in the production of superalloy turbine blades. Notably, because the filaments are provided in a large quantity consistent with formation of a pattern of effusion cooling holes in the surface of a turbine blade, the need for a ball chute structure in FIG. 2 may be eliminated. The tip pins 905 connecting the tip plenum core 904 to the core 900 may be retained. After removal of the ceramic mold, tip holes exist between the core 900 and the tip plenum core 904 that may be subsequently brazed shut. At the tip portion of the integrated core-shell mold, there exists a void or space 903 between the shell 901 and the tip plenum core 904.

As shown in FIG. 9, the core 900 further includes several protrusion patterns that that extend away from the center of the mold, such as but not limited to protrusion pattern 906 which is connected to and is an extension of the shell 901 at the tip portion of the mold and protrusion patterns 907, 908 that extend away from the center of the mold in opposing directions at the base portion of the mold.

The filaments 902, 909, 910, 911 and 912 are preferably cylindrical or oval shape but may also be curved or non-linear. Their exact dimensions may be varied according to a desired film cooling scheme for a particular cast metal part. For example cooling holes may have a cross sectional area ranging from 0.01 to 2 mm$^2$. In a turbine blade, the cross sectional area may range from 0.01 to 0.15 mm$^2$, more preferably from 0.05 to 0.1 mm$^2$, and most preferably about 0.07 mm$^2$. In the case of a vane, the cooling holes may have a cross sectional area ranging from 0.05 to 0.2 mm$^2$, more preferably 0.1 to 0.18 mm$^2$, and most preferably about 0.16 mm$^2$. The spacing of the cooling holes is typically a multiple of the diameter of the cooling holes ranging from 2× to 10× the diameter of the cooling holes, most preferably about 4-7× the diameter of the holes.

The length of the filament 902 is dictated by the thickness of the cast component, e.g., turbine blade wall thickness, and the angle at which the cooling hole is disposed relative to the surface of the cast component. The typical lengths range from 0.5 to 5 mm, more preferably between 0.7 to 1 mm, and most preferably about 0.9 mm. The angle at which a cooling hole is disposed is approximately 5 to 35° relative to the surface, more preferably between 10 to 20°, and most preferably approximately 12°. It should be appreciated that the methods of casting according to the present invention allow for formation of cooling holes having a lower angle relative to the surface of the cast component than currently available using conventional machining techniques.

Figure 10:
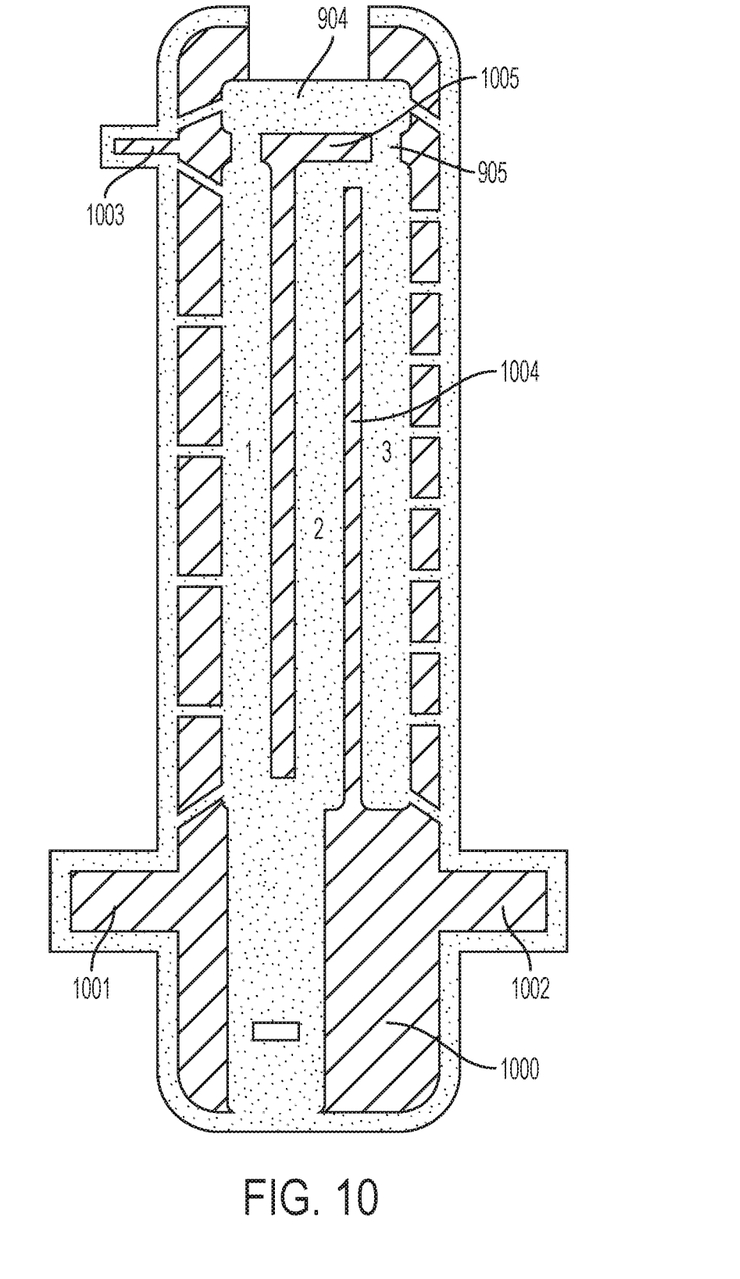
FIG. 10 shows a side view of a metal-filled integrated core-shell mold according to an embodiment of the present invention.

FIG. 10 shows a side view of an integrated core-shell mold filled with liquid metal to cast a turbine blade and the turbine blade formed after the metal solidifies and the mold is removed. The turbine blade formed includes at least a root portion 1000, an inner vertical surface 1004, an inner horizontal surface 1005 at the tip portion of the blade and a plurality of cooling holes along the entire height or length of the blade (excluding the root portion 1000) and on both the front and back sides of the blade (i.e. the outer surfaces of the blade). Notably, the turbine blade in accordance with the present invention further includes an overhang in the tip portion of the blade and outer portions 1001, 1002 in the root portion 1000 which form at least part of a root component (i.e. blade skirt) or trailing edge of the turbine blade.

Figure 11:
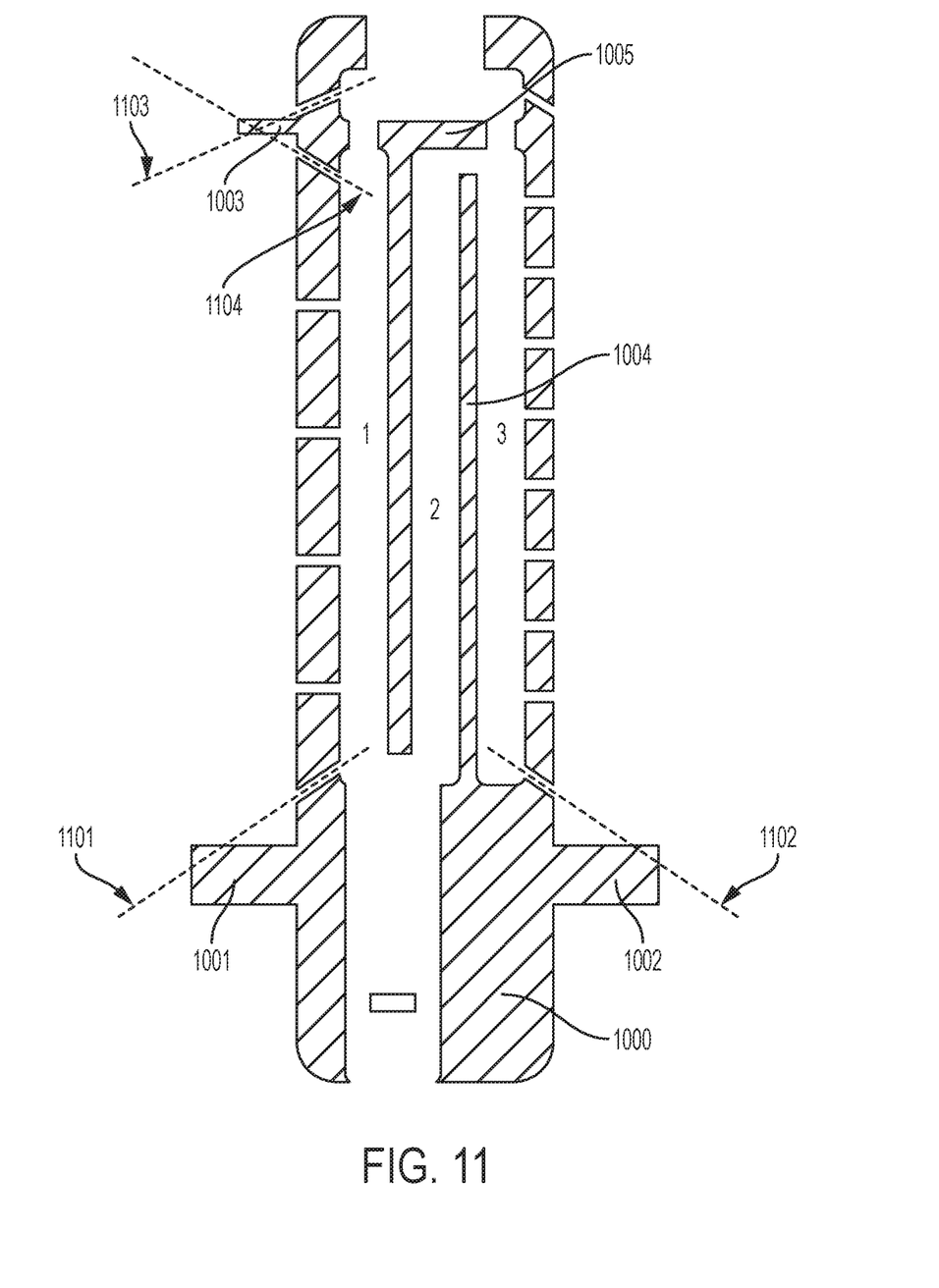
FIG. 11 shows a side view of a superalloy turbine blade formed after removal of the integrated core-shell mold in accordance with one aspect of the invention.

It should be appreciated that the methods of casting and the integrated core-shell mold according to the present invention allow for formation of cooling holes in inaccessible or unattainable locations, which are locations on the external walls of the turbine blade that are proximal to the aforementioned overhang and outer portions, as can be seen in FIG. 11. Specifically, these cooling holes are diagonal or sloping and are located such that an imaginary line (e.g. 1101, 1102, 1103, 1104) joining a first point at the intersection of the cooling hole with the inner cavity and a second point at the intersection of the cooling hole with the outer surface intersects an overhang or an outer portion of the turbine blade. The intersection between the imaginary line and the overhang or the outer portion is further away from the center of the turbine blade than the second point. The only way these cooling holes can be formed on a turbine blade manufactured using conventional casting techniques would be destructively drilling the holes through the metal blade.

After leaching, the resulting holes in the turbine blade from the core print filaments may be brazed shut if desired. Otherwise the holes left by the core print filaments may be incorporated into the design of the internal cooling passages. Alternatively, cooling hole filaments may be provided to connect the tip plenum core to the shell in a sufficient quantity to hold the tip plenum core in place during the metal casting step. After printing the core-shell mold structures in accordance with the invention, the core-shell mold may be cured and/or fired depending upon the requirements of the ceramic core photopolymer material. Molten metal may be poured into the mold to form a cast object in the shape and having the features provided by the integrated core-shell mold. In the case of a turbine blade, the molten metal is preferably a superalloy metal that formed into a single crystal superalloy turbine blade using techniques known to be used with conventional investment casting molds.

In an aspect, the present invention relates to the core-shell mold structures of the present invention incorporated or combined with features of other core-shell molds produced in a similar manner. The following patent applications include disclosure of these various aspects and their use:

U.S. patent application Ser. No. 15/377,728, titled "INTEGRATED CASTING CORE-SHELL STRUCTURE", and filed Dec. 13, 2016;

U.S. patent application Ser. No. 15/377,711, titled "INTEGRATED CASTING CORE-SHELL STRUCTURE WITH FLOATING TIP PLENUM", and filed Dec. 13, 2016;

U.S. patent application Ser. No. 15/377,796, titled "MULTI-PIECE INTEGRATED CORE-SHELL STRUCTURE FOR MAKING CAST COMPONENT", and filed Dec. 13, 2016;

U.S. patent application Ser. No. 15/377,746, titled "MULTI-PIECE INTEGRATED CORE-SHELL STRUCTURE WITH STANDOFF AND/OR BUMPER FOR MAKING CAST COMPONENT", and filed Dec. 13, 2016;

U.S. patent application Ser. No. 15/377,673, titled "INTEGRATED CASTING CORE SHELL STRUCTURE WITH PRINTED TUBES FOR MAKING CAST COMPONENT", and filed Dec. 13, 2016;

U.S. patent application Ser. No. 15/377,759, titled "INTEGRATED CASTING CORE-SHELL STRUCTURE AND FILTER FOR MAKING CAST COMPONENT", and filed Dec. 13, 2016;

U.S. patent application Ser. No. 15/377,787, titled "INTEGRATED CASTING CORE SHELL STRUCTURE FOR MAKING CAST COMPONENT WITH NON-LINEAR HOLES", and filed Dec. 13, 2016;

U.S. patent application Ser. No. 15/377,766, titled "INTEGRATED CASTING CORE SHELL STRUCTURE FOR MAKING CAST COMPONENT HAVING THIN ROOT COMPONENTS", and filed Dec. 13, 2016.

The disclosure of each of these application are incorporated herein in their entirety to the extent they disclose additional aspects of core-shell molds and methods of making that can be used in conjunction with the core-shell molds disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating a ceramic mold, comprising:
   (a) contacting a cured portion of a workpiece with a liquid ceramic photopolymer;
   (b) irradiating a portion of the liquid ceramic photopolymer adjacent to the cured portion through a window contacting the liquid ceramic photopolymer;
   (c) removing the workpiece from the uncured liquid ceramic photopolymer; and
   (d) repeating steps (a)-(c) until a ceramic mold is formed, the ceramic mold comprising:
      (1) a core portion and a shell portion with at least one cavity between the core portion and the shell portion, the cavity adapted to define the shape of a cast component upon casting and removal of the ceramic mold, and
      (2) a plurality of filaments joining the core portion and the shell portion where each filament spans between the core and shell and defines a hole in the cast component upon removal of the mold, wherein the filament intersects the core at a first point and the filament intersects the shell at a second point, and an imaginary line joining the first point and the second point also intersects an outer portion of the cavity that extends further away from the center of the mold than the second point.

2. The method of claim 1, wherein the process comprises, after step (d), a step (e) comprising pouring a liquid metal into a casting mold and solidifying the liquid metal to form the cast component.

3. The method of claim 2, wherein the process comprises, after step (e), a step (f) comprising removing the mold from the cast component.

4. The method of claim 3, wherein removing the mold from the cast component comprises a combination of mechanical force and chemical leaching.

5. The method of claim 1, wherein the outer portion forms at least part of a root component of a turbine blade or stator vane.

6. The method of claim 1, wherein the outer portion forms at least part of a trailing edge of a turbine blade or stator vane.

7. The method of claim 1, the outer portion forms at least part of an overhang in a turbine blade or stator vane.

8. A method of preparing a cast component comprising:
   (a) pouring a liquid metal into a ceramic casting mold and solidifying the liquid metal to form the cast component, the ceramic casting mold comprising:
      (1) a core portion and a shell portion with at least one cavity between the core portion and the shell portion, the cavity adapted to define the shape of a cast component upon casting and removal of the ceramic mold, and (2) a plurality of filaments joining the core portion and the shell portion where each filament spans between the core and shell and defines a hole in the cast component, wherein the filament intersects the core at a first point and the filament intersects the shell at a second point, and an imaginary line joining the first point and the second point also intersects an outer portion of the cavity that extends further away from the center of the mold than the second point;

(b) removing the ceramic casting mold from the cast component by leaching at least a portion of the ceramic core through the holes in the cast component.

9. The method of claim 8, wherein removing the ceramic casting mold from the cast component comprises a combination of mechanical force and chemical leaching.

10. The method of claim 8, wherein the outer portion is part of a root component or trailing edge of a turbine blade or stator vane.

11. The method of claim 8, wherein the outer portion is an overhang in a turbine blade or stator vane.

12. A ceramic casting mold comprising:
a core portion and a shell portion with at least one cavity between the core portion and the shell portion, the cavity adapted to define the shape of a cast component upon casting and removal of the ceramic mold, and
a plurality of filaments joining the core portion and the shell portion where each filament spans between the core and shell and defines a hole in the cast component, wherein the filament intersects the core at a first point and the filament intersects the shell at a second point, and an imaginary line joining the first point and the second point also intersects an outer portion of the cavity that extends further away from the center of the mold than the second point;
wherein the outer portion forms at least part of a root component of a turbine blade or stator vane, at least part of a trailing edge of a turbine blade or stator vane, or at least part of an overhang in a turbine blade or stator.

13. A single crystal metal turbine blade or stator vane having an inner cavity and an outer surface, a plurality of cooling holes providing fluid communication between the inner cavity and outer surface, wherein at least one hole is wherein at least one cooling hole is located such that an imaginary line joining a first point at the intersection of the cooling hole with the inner cavity and a second point at the intersection of the cooling hole with the outer surface intersects an outer portion of the turbine blade or stator vane extending further away from the center of the turbine blade or stator vane than the second point;
wherein the outer portion forms at least part of a trailing edge of a turbine blade or stator vane, or at least part of an overhang in a turbine blade or stator vane.

\* \* \* \* \*